Patented Jan. 13, 1925.

1,522,611

UNITED STATES PATENT OFFICE.

LAWRENCE BRADSHAW, OF NEW YORK, N. Y., ASSIGNOR TO HENRY V. DUNHAM, OF MOUNT VERNON, NEW YORK.

ADHESIVE AND PROCESS OF MAKING SAME.

No Drawing.  Application filed October 9, 1923. Serial No. 667,473.

*To all whom it may concern:*

Be it known that I, LAWRENCE BRADSHAW, a subject of the King of Great Britain, residing in the borough of Manhattan, city and State of New York, United States of America, have invented certain new and useful Improvements in Adhesives and Processes of Making Same, of which the following is a specification.

My invention comprises, broadly speaking, the process of treating unburst starch with a phenol, that is with carbolic acid or cresylic acid, or with the salts of such acids, to produce a glue, and also to the product of such process.

In carrying out my invention, the starch and the acid or salt are mixed in the presence of water and preferably in all cases subjected to a temperature of 150–160° F., that is to say, to a temperature above the bursting temperature of the starch. When carbolic acid or cresylic acid is employed, heating is not essential as these acids possess a property of acting upon starch in the presence of water to produce swelling and rupture of the granules at room temperature, but I nevertheless should prefer to apply heat as by so doing I may obtain the desired adhesive with the use of less of the acid. When the sodium and potassium salts of these acids are used heat is not essential, as they likewise possess the property of acting upon starch in the presence of water to produce swelling and rupture of the granules at room temperature, but I should, nevertheless, prefer to apply heat as by so doing I may obtain the desired glue with the use of a much smaller amount of the salt; with these salts the application of heat is even more advisable than when the acids are used, as comparatively large quantities of the salt are necessary to produce the desired effect at room temperature. With the remaining salts, if used without the addition of other chemicals, the application of heat to approximately the indicated temperature is essential as they will not rupture the granules.

For commercial purposes I prefer to use the calcium salts of these acids and especially calcium phenate, as such substance is not only relatively inexpensive but is more pleasant to handle than the acids and more easily handled than the sodium and potassium salts, which are hygroscopic. The calcium salts may readily be mixed with dry starch and when so mixed will not affect the starch until water is added and heat applied. Such a mixture may be stored, and may be shipped to the point of consumption and there mixed with water and heated to form the adhesive; storage and transportation charges on the water, necessarily present in the finished adhesive, thus being saved.

The phenols and their salts, even when relatively small proportions are used, have a marked effect on the character of starch jelly produced when starch is heated with water to a temperature above the bursting point. For example, the addition of 1% of sodium phenate or calcium phenate causes a very marked lowering of the viscosity and increases the adhesive properties of the product.

The phenols and their salts form, with starch, starch-phenol compounds which constitute glues suitable for firmly uniting wood surfaces when used with comparatively small proportions of water, such as 2¼ parts of water by weight to one part of the compound calculated as dry material; they can be spread easily upon the surfaces to be united, and only a very thin layer thereof is necessary to secure strong adhesion.

The proportion of phenol or phenolic salt to be used may readily be determined by preliminary experiment. Enough should be used to obtain the desired effect under the desired conditions of operation and no more should be used than necessary to obtain such effect. For instance, when carbolic acid, cresylic acid or their sodium or potassium salts are used, a less proportion of these substances is needed if heat is applied, as already explained. It is, of course, obvious that if too little or too much of the material be used to obtain a complete bursting of all the starch granules, such process would still involve my invention as long as the bursting of a substantial proportion of the granules takes place.

When using the acids it is desirable to neutralize them, after they have done their work, by means of a suitable alkali.

It is obvious that it would not constitute a departure from my invention to add other substances during the treatment of the starch or at a later period, as long as the acid or its salt is permitted to have the effect or effects hereinabove described. For instance, the addition of an excess of alkali over that needed for the neutralization of the acid would not constitute a departure from my invention.

The starch which I prefer to use is cassava starch for the reason that it has greater adhesive strength than any other starch known to me.

The following examples are given by way of illustration of my process but it is to be understood that the invention is not limited by such examples:

Example 1.

Two hundred and twenty (220) pounds of cold water are placed in a suitable vessel preferably a steam-jacketed kettle provided with an efficient stirrer. One hundred (100) pounds of starch, preferably cassava starch, are added and the suspension well stirred, say, at room temperature until free from lumps. I then add five (5) pounds of carbolic acid mixed with about five (5) pounds of warm water and then I gradually apply steam heat with continuous stirring until a temperature of about 150-160° F. is reached and the product appears uniform. After shutting off the steam I then add a suitable alkali in quantity sufficient to neutralize the acid, for instance one and one-half (1½) pounds of quicklime or an equivalent amount of calcium hydroxid, which may be mixed with about five (5) pounds of warm water and allow to cool, the stirring being continued for ¼-2 hours or longer until the mass acquires the desired consistency. If desired, the cooling can be accelerated by circulating cold water through the jacket.

Example 2.

Two hundred and thirty (230) pounds of tepid water (say, about 90 to 105° F.) are placed in a suitable receptacle and stirred with one hundred (100) pounds of starch until the suspension is free from lumps. A mixture of one (1) pound of phenol with about an equal weight of warm water is then added and the whole heated with efficient stirring, to about 160° F., as in Example 1. The heating is then stopped and a mixture of about three (3) pounds of slaked lime with six (6) pounds of water is added and the stirring continued as in Example 1.

Example 3.

Two hundred and fifteen (215) pounds of water are placed in a suitable receptacle and stirred with one hundred (100) pounds of cassava starch to form a uniform suspension. A solution of one (1) pound of sodium phenate in about one (1) pound of water is then added and the whole stirred and heated to 150-160° F. until it assumes a semi-transparent appearance and uniform character. It is then allowed to cool with continuous stirring.

Example 4.

To two hundred and twenty (220) pounds of water contained in a steam-jacketed kettle are added one hundred (100) pounds of a mixture of starch with about 2% of calcium cresate. The suspension is well agitated, heated to about 160° F. and stirred as in Example 1.

Example 5.

One hundred (100) pounds of dry starch, such as cassava starch, are intimately mixed with one-half (½) to one (1) pound of sodium cresylate. This produces a dry mixture which can be stored or shipped if desired. This dry mixture is subsequently mixed with water and treated in accordance with the above examples.

Example 6.

One hundred (100) pounds of dry cassava starch are intimately mixed with two and one-half (2½) pounds of dry calcium phenate. This mixture, like the mixture of Example 4, may be stored and shipped dry in an ordinary box to the place of use. When it is desired to use the adhesive about two hundred and twenty (220) pounds of cold water are added to the mixture which is then stirred until free from lumps. Heat, preferably steam heat, is gradually applied while the stirring is continued until a temperature of 150-160° F. is reached and the product appears uniform. It will be found that the product has become uniform after about 20-30 minutes of heating and is then ready for use. This example is, according to the best of my present knowledge, my preferred commercial form.

The glue produced by my method is very strong. Owing to the absence of high alkalinity the tendency to discolor wood is largely eliminated and any slight discoloration which might result would not penetrate or show through the outer surface of veneer.

In place of the ordinary commercial starches, such as cassava, I may use a so-called "modified starch" or starch treated with an acid such as hydrochloric or sulfuric acid for the purpose of modifying the ultimate viscosity of the glue.

In the appended claims the term "a phenol" is intended to include "carbolic acid" and "cresylic acid", and the term "a simple phenolic body" is intended to cover the phenols and the salts of the same, such as those above mentioned. The term "alkali-forming metal" is intended to embrace alkali metals, and alkaline earth metals.

When I speak in my claims of treating unburst starch with a phenolic body, I mean, of course, that I provide conditions under which a reaction between the two can take place. Water should be present and in some cases the treatment necessarily includes heating to the bursting point of starch, while in the remaining cases the application of such heat while not necessary is, as explained, regarded as advisable.

The terms "phenate" and "cresate" are used herein in their ordinary sense, to designate salts of carbolic acid and cresol respectively, e. g., $C_6H_5ONa$ and $C_7H_7ONa$ respectively. The term "penolate" is used in its generic sense, to indicate salts of phenolic bodies generally, including the two species above referred to.

I claim:

1. In the manufacture of starch glue, the step of treating unburst starch with a simple phenolic body, the latter being used in quantity sufficient to convert a substantial part at least of the starch, into a phenolic compound of starch.

2. In the manufacture of starch glue, the step of treating unburst starch with a phenolate of an alkali-forming metal, the latter being used in quantity sufficient to convert a substantial part at least of the starch, into a phenolic compound of starch.

3. In the manufacture of starch glue, the step of treating unburst starch with calcium phenate, the latter being used in quantity sufficient to convert a substantial part at least of the starch, into a phenolic compound of starch.

4. In the manufacture of starch glue, the step of heating unburst starch, together with a simple phenolic body, the latter being used in quantity sufficient to convert a substantial part at least of the starch, into a phenolic compound of starch.

5. A process which comprises treating unburst starch with a phenolate of an alkali-forming metal.

6. A process which comprises treating unburst starch with calcium phenate.

7. A glue which consists of a starch-phenol compound made by treating unburst starch with a simple phenolic body, and a limited amount of water.

8. A glue which comprises a starch-phenol compound comprising unburst starch treated with a phenolate of an alkli-forming metal.

9. A glue which consists of a starch-phenol compound made by treating unburst starch with a limited amount of water and the phenolate of an alkali forming metal.

10. A glue which consists of a starch-phenol compound made by treating unburst starch with calcium phenate and by heating these substances to the bursting temperature of starch in the presence of water.

11. As a glue base, a mixture comprising unburst starch and a simple phenolic body, the latter being present in an amount sufficient to convert at least a substantial portion of the starch into a starch-phenol compound.

12. As a glue base a mixture comprising unburst starch with a phenolate of an alkali-forming metal, the latter being present in an amount sufficient to convert at least a substantial portion of the starch into a starch phenol compound.

13. As a glue base, a mixture comprising unburst starch with a phenolate of an alkali-forming metal, the latter being present in an amount sufficient to convert at least a substantial portion of the starch into a starch-phenol compound.

14. As a glue base a mixture comprising unburst starch with calcium phenate, the latter being present in an amount sufficient to convert at least a substantial portion of the starch into a starch-phenol compound.

15. An adhesive material comprising the reaction products of starch with a phenolate of an alkali-forming metal.

16. An adhesive material comprising the reaction products of starch with calcium phenate.

LAWRENCE BRADSHAW.